(12) United States Patent
Tashiro et al.

(10) Patent No.: US 7,306,730 B2
(45) Date of Patent: Dec. 11, 2007

(54) CYCLONE-TYPE SEPARATOR FOR SEPARATING FOREIGN MATTERS BY UTILIZING A CENTRIFUGAL FORCE

(75) Inventors: Minoru Tashiro, Tokyo (JP); Makoto Tashiro, Tokyo (JP)

(73) Assignee: Bunri Incorporated, Miyazaki (JP)

( * ) Notice: Subject to any disclaimer, the term of this patent is extended or adjusted under 35 U.S.C. 154(b) by 168 days.

(21) Appl. No.: 11/304,706

(22) Filed: Dec. 16, 2005

(65) Prior Publication Data
US 2006/0091071 A1    May 4, 2006

Related U.S. Application Data

(63) Continuation of application No. PCT/JP2004/008768, filed on Jun. 16, 2004.

(30) Foreign Application Priority Data
Jun. 16, 2003    (JP)    ............... 2003-170725

(51) Int. Cl.
    B23Q 11/00    (2006.01)
    B01D 17/038    (2006.01)
    B04C 5/12    (2006.01)
(52) U.S. Cl. .................. 210/512.1; 210/788; 209/725; 209/730; 209/732

(58) Field of Classification Search ............. 210/512.1, 210/788; 209/725, 730, 732
See application file for complete search history.

(56) References Cited

FOREIGN PATENT DOCUMENTS

| JP | 50-4148 | 2/1975 |
|---|---|---|
| JP | 2003-210908 | 7/2003 |

*Primary Examiner*—David A Reifsnyder
(74) *Attorney, Agent, or Firm*—Bacon & Thomas, PLLC

(57) ABSTRACT

A cyclone-type separator comprises a hollow cylindrical main body in to which liquid containing foreign matter is introduced, a clean room provided in an upper end of the main body, a communication pipe which connects the clean room to an interior of the main body, and a porous separating pipe arranged in the clean room. As the liquid swirls in the main body, an eddy stream is generated. A columnar air layer and a clean liquid layer are formed, both aligned with the centerline of the eddy stream. The air layer and the liquid layer are guided via the communication pipe into the separating pipe. At the bottom of the clean room, there are provided a first reservoir for storing the liquid coming through the separating pipe, a second reservoir for storing the liquid flowing from the first reservoir, and a coolant outlet port for discharging the clean liquid.

5 Claims, 4 Drawing Sheets

CYCLONE-TYPE SEPARATOR FOR SEPARATING FOREIGN MATTERS BY UTILIZING A CENTRIFUGAL FORCE

CROSS REFERENCE TO RELATED APPLICATIONS

This is a Continuation Application of PCT Application No. PCT/JP2004/008768, filed Jun. 16, 2004, which was published under PCT Article 21(2) in Japanese.

This application is based upon and claims the benefit of priority from prior Japanese Patent Application No. 2003-170725, filed Jun. 16, 2003, the entire contents of which are incorporated herein by reference.

BACKGROUND OF THE INVENTION

1. Field of the Invention

The present invention relates to a cyclone-type separator that utilizes a centrifugal force to separate solid matter from liquid coolants such as cutting fluid and grinding fluid for use in machine tools. More particularly, the invention relates to a structure that prevents liquid coolants from bubbling after foreign matter has been removed from them.

2. Description of the Related Art

In the process of cutting metal work pieces, a water-soluble liquid coolant composed mainly of much water is used to increase the lifetime of the tools, to enhance the precision of cutting and to remove chips fast. A water-soluble liquid coolant of this type is used over again. Hence, solid matter such as chips and metal particles should be quickly removed from the liquid coolant.

Known hitherto as a means for removing such matter is a cyclone-type separator. The cyclone-type separator comprises a main body, an inlet-port unit, a clean room, and a communication pipe. The main body has a discharge port in its lower end. The inlet-port unit introduces a dirty liquid coolant containing solid matter, into the main body. The clean room is provided in the upper end of the main body. The communication pipe guides the liquid coolant cleaned in the main body, into the clean room.

The main body is a conical hollow body whose diameter gradually decreases toward the discharge port. The inlet-port unit is provided in the upper end of the main body and injects the dirty liquid coolant into the main body. The dirty liquid coolant falls along the inner surface of the main body, in the form of an eddy stream. The eddy stream of coolant, thus generated in the main body, provides a centrifugal force. The centrifugal force separates the foreign matter from the liquid coolant. The foreign matter separated fall along the inner surface of the main body and is discharged from the main body through the discharge port.

The eddy stream of the coolant, falling along the inner surface of the main body, starts flowing upwards near the discharge port. That is, an upward eddy stream develops on the centerline of the main body, moving from the discharge port toward the clean room. The upward eddy stream includes a columnar air layer and a clean coolant layer. The columnar air layer passes through the communication pipe, reaching the clean room. The clean coolant layer rises along the circumferential surface of the columnar air layer.

The liquid coolant cleaned in the main body is guided into the clean room, along with the upward eddy stream, and thence into a coolant tank.

In the conventional cyclone-type separator, the columnar air layer and the coolant layer surrounding this air layer move upwards along the centerline of the main body, without mixing with each other. They move through the communication pipe, reaching the clean room.

In the conventional cyclone-type separator, an outlet port located at the downstream end of the communication pipe opens directly to the clean room. Inevitably, the air layer and the coolant layer mix with each other. That is, air mingles into the liquid coolant.

Consequently, the liquid coolant violently bubbles in the clean room, forming a great amount of foam. The foam enters the coolant tank as the liquid coolant flows into the tank. The coolant tank is inevitably filled with the foam, which may overflow the coolant tank.

To prevent the overflowing, de-foaming agent is added to the liquid coolant that has been cleaned, or a device dedicated to de-foaming is provided outside the main body.

As generally known, however, the de-foaming agent is a factor that degrades the cooling efficiency of the liquid coolant. A repeated use of the liquid coolant containing the de-foaming agent may lead to poor cutting results or may shorten the lifetime of the tools.

If a device for de-foaming the coolant is used, the system that reuses the liquid coolant will be a large-scale one, requiring a high operating cost and a large installation space.

BRIEF SUMMARY OF THE INVENTION

An object of this invention is to provide a cyclone-type separator for separating foreign matter from liquid, in which the liquid cleaned can be prevented from bubbling, without using de-foaming agent or a device dedicated to de-foaming.

To achieve the object, a cyclone-type separator for separating solid foreign matter from liquid, according to one aspect of the present invention, comprises: a hollow cylindrical main body which has a discharge port in a lower end; an inlet port which introduces the liquid into the main body, causing the liquid to swirl in the main body, the liquid containing solid foreign matter; a clean room which is provided in an upper end of the main body; and a communication pipe which connects the clean room to an interior of the main body.

In the cyclone-type separator, the foreign matter contained in the liquid is separated by virtue of a centrifugal force as the liquid swirls in the main body, and the foreign matter thus separated is made to fall along an inner surface of the main body and is discharged through the discharge port. A columnar air layer is generated, which is aligned with a centerline of an eddy stream generated due to the swirling of the liquid and which flows from the discharge port to the clean room through the communication pipe. A clean liquid layer is formed, too, which is free of the foreign matter and which rises along a circumferential surface of the columnar air layer. The clean liquid is discharged from the clean room after having been guided into the clean room along the circumferential surface of the air layer.

In the cyclone-type separator according to the aspect of this invention, a porous separating pipe is arranged in the clean room and connected to the communication pipe. In addition, there are provided a first reservoir provided on a bottom of the clean room, surrounding the separating pipe and configured to store temporarily the liquid flowing the separating pipe, a second reservoir configured to store temporarily the liquid flowing from the first reservoir, and a liquid outlet port which opens below a surface level of the liquid stored in the second reservoir.

With this configuration, the liquid cleaned in the main body flows from the communication pipe into the separating pipe. The clean liquid rises along the circumferential surface of the columnar air layer. When the liquid reaches the separating pipe, it flows into the first reservoir and is stored in the first reservoir. In other words, the first reservoir filled with the liquid is formed, surrounding the separating pipe. Hence, only the liquid that has flowed into the separating pipe can be extracted.

The clean liquid flows from the first reservoir into the second reservoir and is temporarily stored therein. The liquid is discharged from the second reservoir, and ultimately from the clean room through the liquid outlet port. The coolant outlet port is located below the surface level of the liquid stored in the second reservoir. Hence, the liquid never mixes with air in the clean room. The liquid is reliably prevented from bubbling.

DETAILED DESCRIPTION OF THE INVENTION

A first embodiment of this invention will be described, with reference to FIGS. 1 to 4.

Figure 1:
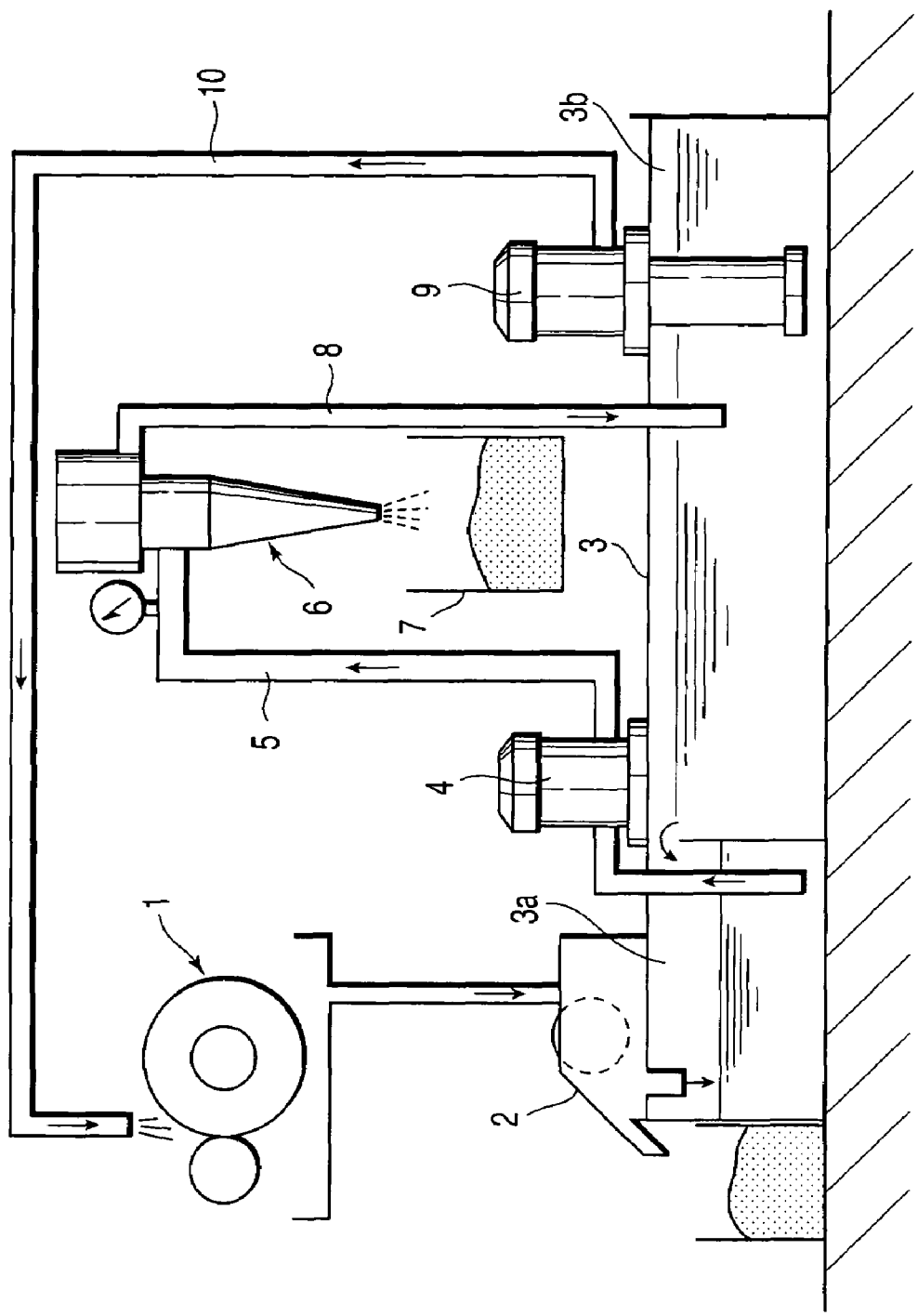
FIG. 1 is a side view schematically showing a recycle system incorporating a first embodiment of this invention, which removes foreign matter from liquid coolant so that the coolant may be reused.

FIG. 1 outlines a recycle system in which foreign matter is removed from liquid and is thereby rendered to be reusable. An example of the liquid is water-soluble liquid coolant that is to be supplied a machine tool 1 such as a polishing machine. The liquid coolant discharged from the machine tool 1 contains foreign matter such as chips and metal particles.

The foreign matter in the liquid coolant may be magnetic particles such as iron powder. In this case, the liquid coolant is first guided into a magnetic separator 2. The magnetic separator 2 removes the magnetic particles from the liquid coolant.

After passing through the magnetic separator 2, the liquid coolant flows into the first reserve chamber 3a of a coolant tank 3. The liquid coolant is pumped up from the first reserve chamber 3a by means of a first pump 4 and supplied through an inlet pipe 5 to a cyclone-type separator 6 for separating foreign matters. The cyclone-type separator 6 separates, by virtue of a centrifugal force, the fine particles of foreign matter that the magnetic separator 2 could not removed. The separator 6 is provided on the coolant tank 3. The foreign matter that the cyclone-type separator 6 has separated is discharged as sludge into a collection tank 7.

The liquid coolant thus cleaned in the cyclone-type separator 6 is fed back into a second reserve chamber 3b of the coolant tank 3 through an outlet pipe 8. The clean liquid coolant is pumped up from the second reserve chamber 3b by means of a second pump 9 and is supplied again to the machine tool 1 through a supply pipe 10.

The liquid coolant may contain non-magnetic foreign matter such as aluminum or copper. In this case, the liquid coolant is guided from the machine tool 1, directly into a dirty chamber (not shown) of the coolant tank 3. Then, the liquid coolant is supplied from the dirty chamber to the cyclone-type separator 6.

Figure 2:
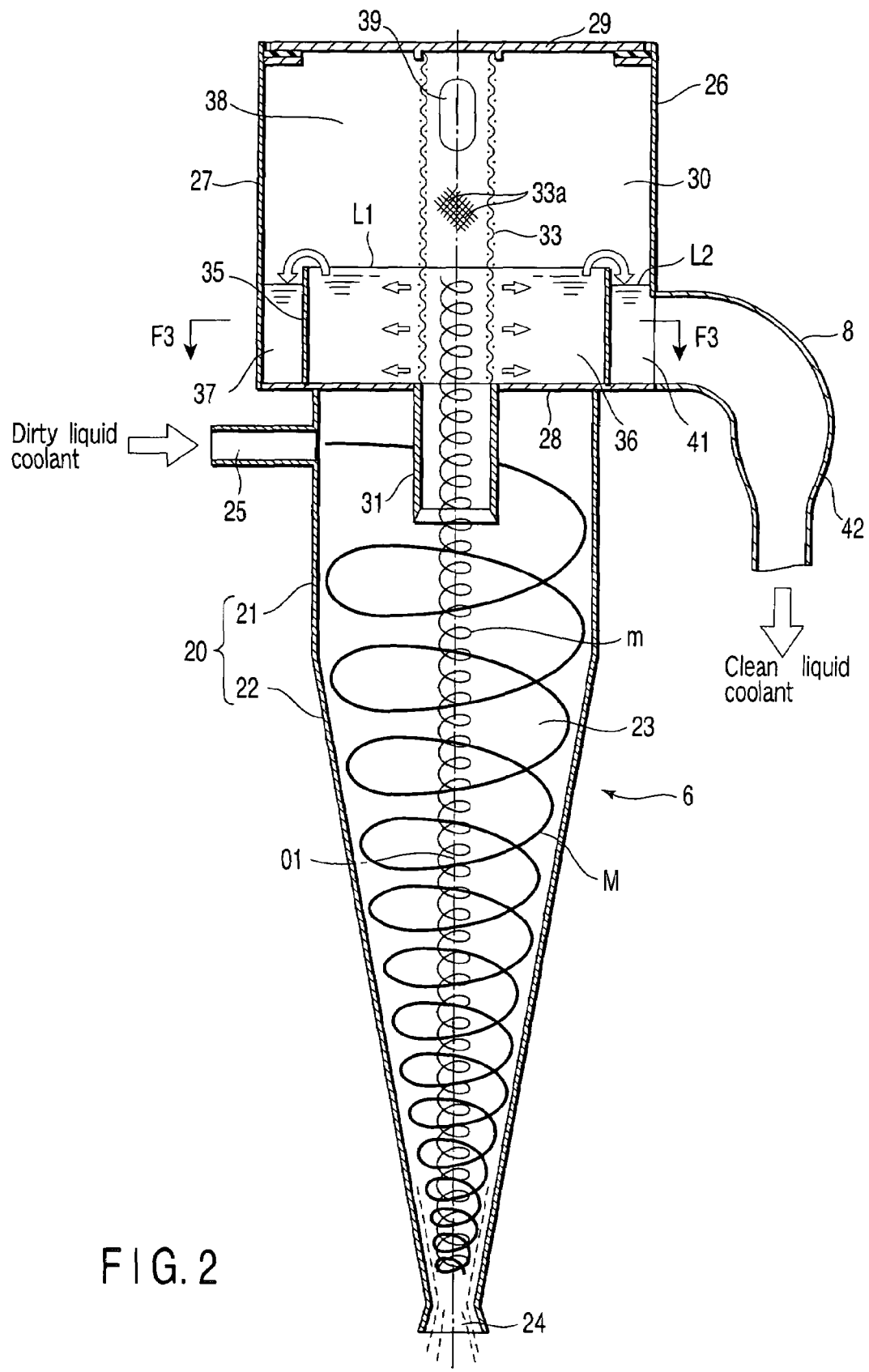
FIG. 2 is a sectional view of a cyclone-type separator according to the first embodiment of the present invention.

The cyclone-type separator 6 used in the recycle system will be described in detail. As FIG. 2 depicts, the cyclone-type separator 6 comprises a hollow main body 20. The main body 20 has a cylindrical part 21 and a conical part 22. The cylindrical part 21 is the upper part of the main body 20. The conical part 22 is coaxial with the cylindrical part 21. The conical part 22 has its diameter gradually decreasing toward the lower end of the main body 20. Therefore, the interior of the main body 20 is an eddy-generating chamber 23 that gradually narrows toward the lower end. The conical part 22 has a discharge port 24 in its lower end. The discharge port 24 opens to the eddy-generating chamber 23 and is located right above the collection tank 7.

The cylindrical part 21 has an inlet port 25, to which the inlet pipe 5 is connected. The inlet port 25 opens to the upper-end part of the eddy-generating chamber 23 and projects in a direction tangent to the cylindrical part 21. The liquid coolant guided from the inlet pipe 5 to the inlet port 25 spouts into the eddy-generating chamber 23 in the direction tangent to the cylindrical part 21.

To the upper end of the main body 20 there is secured a clean case 26. The clean case 26 has a case body 27, a bottom plate 28, and a top plate 29. The case body 27 is a hollow cylinder. The bottom plate 28 closes the lower end of the case body 27. The top plate 29 closes the upper end of the case body 27 and can be removed. The case body 27, bottom plate 28 and top plate 29 define a clean room 30, into which the clean liquid coolant is introduced. The bottom plate 28 is provided between the cylindrical part 21 and the case body 27 and functions as partition between the eddy-generating chamber 23 and the clean room 30.

A communication pipe 31 is secured to a center part of the bottom plate 28 and extends downwards. The communication pipe 31 aligns with the centerline 01 of the main body 20 and penetrates the bottom plate 28. The communication pipe 31 connects the top of the eddy-generating chamber 23 and the clean room 30.

Figure 3:
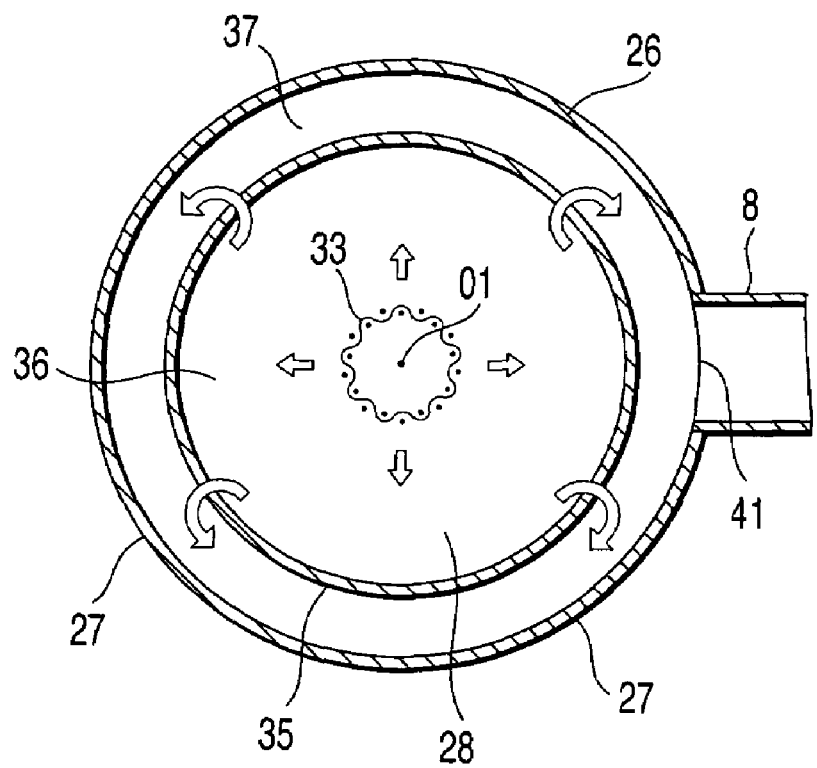
FIG. 3 is a sectional view, taken along line F3-F3 shown in FIG. 2.

As FIGS. 2 and 3 show, the clean room 30 contains a porous separating pipe 33. The separating pipe 33 extends between the upper end of the communication pipe 31 and the top plate 29 and aligns with the centerline 01 of the main body 20. The separating pipe 33 is a hollow cylinder formed by processing, for example, a punching metal member and has a number of tiny through holes 33a. The through holes 33a allow passage of the cleaned liquid coolant. Their diameter is, for example, 1.0 mm.

A partition wall 35 shaped like a hollow cylinder stands on the upper surface of the bottom plate 28 that is the bottom of the clean room 30. The partition wall 35 is coaxial with the separating pipe 33 and surrounds the separating pipe 33. Between the partition wall 35 and the separating pipe 33, a first reservoir 36 is provided to store temporarily the clean liquid coolant coming through the through holes 33a of the separating pipe 33. The first reservoir 36 is positioned at the bottom of the clean room 30. Hence, the lower half of the separating pipe 33 is immersed in the liquid coolant.

The partition wall 35 defines a second reservoir 37, jointly with the inner surface of the case body 27. The second reservoir 37 is provided to store temporarily the clean coolant that overflows the partition wall 35. The second reservoir 37 is coaxial with the first reservoir 36 and surrounds the same.

The clean room 30 has an air-accumulating space 38. The air-accumulating space 38 lies on the first and second reservoirs 36 and 37. The coolant in the first reservoir 36 is exposed at its surface level L1 to the air-accumulating space 38. So is the coolant in the second reservoir 37 at its surface level L2.

The upper half of the separating pipe 33 lies in the air-accumulating space 38 and has an escape hole 39. Through the escape hole 39, the liquid coolant flown into the separating pipe 33 is discharged when the separating pipe 33 is clogged. The escape hole 39 has a much larger opening than the through holes 33a.

As shown in FIG. 2, the case body 27 has a coolant outlet port 41. The coolant outlet port 41 opens to the second reservoir 37 and is positioned below the surface level L2 of the liquid coolant in the second reservoir 37.

The outlet pipe 8 is connected to the coolant outlet port 41. The outlet pipe 8 extends from the coolant outlet port 41 toward the second reserve chamber 3b of the coolant tank 3. Thus, the liquid coolant flows down from the second reservoir 37 into the second reserve chamber 3b of the coolant tank 3 through the outlet pipe 8.

A throttle 42 is formed in the upper end of the outlet pipe 8. The throttle 42 controls the flow of the liquid coolant from the second reservoir 37 to the coolant tank 3. In other words, the throttle 43 adjusts the flow rate of the liquid coolant flowing from the coolant outlet port 41, ultimately maintaining the surface level L2 of the liquid coolant in the second reservoir 37 at a predetermined position. As a result, the surface level L2 of the liquid coolant remains above the coolant outlet port 41.

In the cyclone-type separator 6 thus configured, the liquid coolant that contains fine particles of foreign matter that the magnetic separator 2 could not remove is introduced through the inlet port 25 into the eddy-generating chamber 23. The liquid coolant spouts into the eddy-generating chamber 23 in a direction tangent to the cylindrical part 21. The liquid coolant therefore flows down, swirling along the inner surfaces of the cylindrical part 21 and conical part 22, as indicated by a thick spiral shown in FIG. 2.

An eddy stream M that swirls around the centerline 01 is therefore generated in the eddy-generating chamber 23. The eddy stream M generates a centrifugal force, which separates fine particles of foreign matter, such as chips, from the liquid coolant. The foreign matter thus separated accumulates on the inner surface of the conical part 22 and eventually falls, swirling along the inner surface of the conical part 22. Finally, the foreign matter is discharged as sledge through the discharge port 24, together with a little amount of liquid coolant, and is collected in the collection tank 7.

In the meantime, the eddy stream M falling down along the inner surface of the conical part 22 turns upwards, receiving an upward force in the vicinity of the discharge port 24. Namely, an upward eddy stream m is generated as indicated by a thin spiral. The upward eddy stream m flows from the discharge port 24 toward the clean room 30, swirling around the centerline 01 of the eddy-generating chamber 23.

Figure 4:
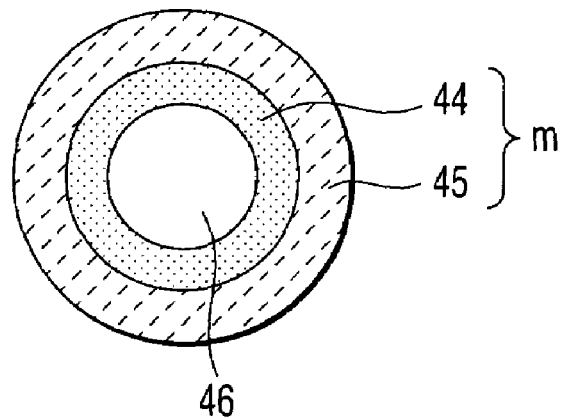
FIG. 4 is a sectional view of an eddy stream generated in the main body of the first embodiment of the invention.

FIG. 4 is a sectional view that schematically showing the upward eddy stream m. As evident from FIG. 4, the upward eddy stream m includes an air layer 44 and a coolant layer 45. The air layer 44 forms a column that has a vacuum hollow 46. The air layer 44 extends through from the discharge port 24 and passes through the communication pipe 31, reaching the separating pipe 33. The coolant layer 45 is made of clean liquid coolant, i.e. the coolant from which foreign matter has been removed. The coolant layer 45 surrounds the air layer 44 and forms the outer peripheral part of the upward eddy stream m. The coolant layer 45 rises from the discharge port 24 toward the separating pipe 33, along the outer circumferential surface of the air layer 44.

When the upward eddy stream m flows into the separating pipe 33, the coolant layer 45, i.e., clean liquid coolant, passes through the through holes 33a of the separating pipe 33 and flows into the first reservoir 36. This liquid coolant is temporarily stored in the first reservoir 36. Hence, the lower half of the separating pipe 33 is immersed in the liquid coolant stored in the first reservoir 36. Only the liquid coolant can therefore be extracted from the upward eddy stream m that has flown into the separating pipe 33.

Thus, the separating pipe 33 can divide the upward eddy stream m into air and coolant before the stream m reaches the air-accumulating space 38 provided in the clean room 30. This prevents the coolant from bubbling in the clean room 30.

As the arrow indicates in FIG. 2, the liquid coolant stored in the first reservoir 36 overflows the partition wall 35, flowing into the second reservoir 37. The liquid coolant is thus temporarily stored in the second reservoir 37 and eventually flows down from the coolant outlet port 41 through the outlet pipe 8 into the second reserve chamber 3b of the coolant tank 3.

Having the throttle 42, the outlet pipe 8 controls the flow rate of the liquid coolant coming through the coolant outlet port 41. Hence, the surface level L2 of the liquid coolant in the second reservoir 37 always remains above the coolant outlet port 41.

Therefore, the coolant outlet port 41 never opens to the air-accumulating space 38 provided in the clean room 30. In addition, air would not leak from the air-accumulating space 38 through the coolant outlet port 41, because the air-accumulating space 38 is a closed and sealed space. Air will be never drawn into the main body 20 through the discharge port 24, and the air layer 44 will remain aligned with the centerline 01 of the eddy-generating chamber 23.

In the first embodiment of this invention, air would not mingle into the liquid coolant as the liquid coolant flows back into the coolant tank 3 after it has cleaned in the main body 20. The coolant will never bubble. No de-foaming agent needs to be added to the liquid coolant. Nor is it necessary to use a device for de-foaming the liquid coolant.

In the cyclone-type separator 6 so configured as described above, it may be proposed that the through holes 33a of the separating pipe 33 have a larger diameter, in order to draw the liquid coolant from the separating pipe 33 at high efficiency. If the through holes 33a have too large a diameter, however, the air layer 44 will be disintegrated, and air will flow into the through holes 33a. Consequently, air will mingle into the liquid coolant at the through holes 33a, forming bubbles.

The experiments the inventors hereof conducted showed that air flowed into the through holes 33a, generating bubbles, when the diameter of the holes 33a exceeded 3.0 mm. In view of this, it is desired that the through holes 33a should have a diameter ranging from 0.5 mm to 2.5 mm, particularly a diameter of 1.0 mm. It was confirmed that changes in the length and diameter of the separating pipe 33, if any, scarcely influenced the diameter of the through holes 33a.

In the fist embodiment of the present invention, the outlet pipe 8 has the throttle 42, which holds the surface level L2 of the liquid coolant always at a predetermined position in the second reservoir 37. Thus, the number of components required is smaller and the passage for supplying the liquid coolant back into the coolant tank 3 is more simple, than in the case where a valve is provided on the outlet pipe 8 to control the flow rate of the liquid coolant. This simplifies the structure of the system and reduces the manufacturing cost thereof.

Figure 5:
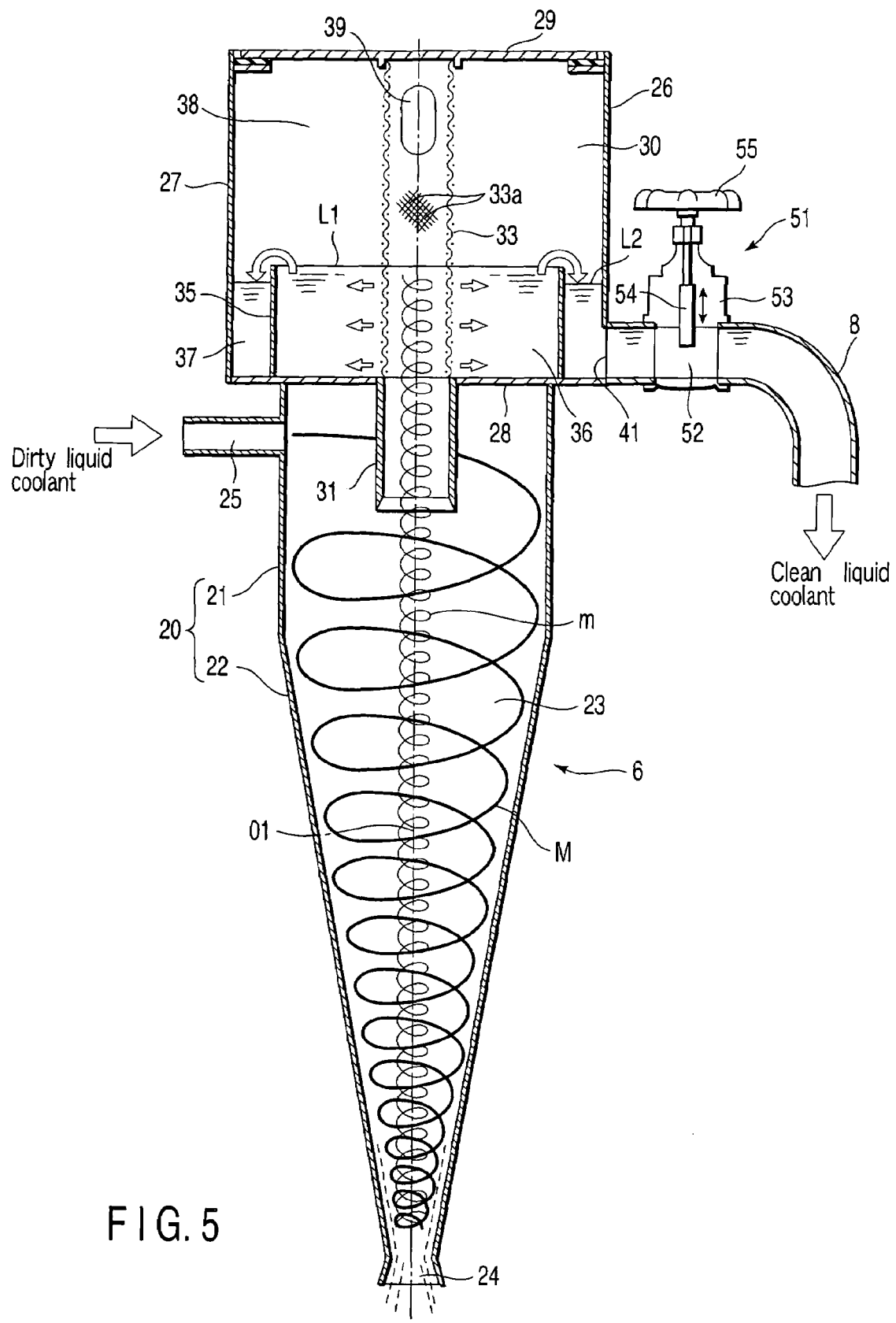
FIG. 5 is a sectional view of a cyclone-type separator according to a second embodiment of the present invention.

The present invention is not limited to the first embodiment described above. FIG. 5 shows a second embodiment of the present invention.

The second embodiment differs from the first embodiment in the structure that holds the surface level L2 of liquid coolant at a predetermined position in the second reservoir 37. In any other structural aspects, the second embodiment is similar to the first embodiment. Therefore, the components identical to those of the first embodiment are designated at the same reference numerals and will not be described.

As FIG. 5 shows, the outlet pipe 8 connected to the coolant outlet port 41 has a uniform diameter. A flow-rate control valve 51 is provided on the outlet pipe 8. The flow-rate control valve 51 is located at the upstream end of the outlet pipe 8 and adjacent to the coolant outlet port 41. The flow-rate control valve 51 adjusts the flow rate at which the liquid coolant flows from the coolant outlet port 41. It comprises a valve box 53, a valve body 54 and a handle 55. The valve box 53 has a passage 52 that is connected to the outlet pipe 8, through which the liquid coolant flows from the coolant outlet port 41. The valve body 54 is held in the valve box 52 and opens or closes the passage 52. When operated, the handle 55 moves the valve body 54, which adjusts the opening of the passage 52. Thus, when the handle 55 is operated, setting the opening of the passage 52 to a desired value, the rate at which the liquid coolant flows from the coolant outlet port 41 changes.

In the second embodiment of this invention, the flow-rate control valve 51 can adjust, as is desired, the rate at which the liquid coolant flows from the coolant outlet port 41. The surface level L2 of liquid coolant stored in the second reservoir 37 can therefore be exactly at a desired position, namely above the coolant outlet port 41. In the coolant outlet port 41, no air will mingle into the liquid coolant. This reliably prevents the liquid coolant from bubbling.

In reducing this invention to practice, the separating pipe is not limited to one that is formed by processing a punching metal member. The separating pipe may be one formed of wire netting.

According to the present invention, no air mingles into the liquid that has bee cleaned. Hence, the liquid will not bubble at all. Any de-foaming agent need not be used. Nor is it necessary to use a device for de-foaming the liquid coolant.

What is claimed is:

1. A cyclone-type separator for separating solid foreign matter from liquid, comprising:

a hollow cylindrical main body which has a discharge port in a lower end;

an inlet port which introduces the liquid into the main body, causing the liquid to swirl in the main body, said liquid containing solid foreign matter;

a clean room which is provided in an upper end of the main body; and a communication pipe which connects the clean room to an interior of the main body, wherein the foreign matter contained in the liquid is separated by virtue of a centrifugal force as the liquid swirls in the main body, and the foreign matter thus separated is made to fall along an inner surface of the main body and is discharged through the discharge port; a columnar air layer is generated, which is aligned with a centerline of an eddy stream generated due to the swirling of the liquid and which flows from the discharge port to the clean room through the communication pipe, a clean liquid layer is formed, which is free of the foreign matter and which rises along a circumferential surface of the columnar air layer, and the clean liquid is discharged from the clean room after having been guided into the clean room along the circumferential surface of the air layer, wherein a porous separating pipe is arranged in the clean room and connected to the communication pipe, and there are provided a first reservoir provided on a bottom of the clean room, surrounding the separating pipe and configured to store temporarily the liquid flowing the separating pipe, a second reservoir configured to store temporarily the liquid flowing from the first reservoir, and a liquid outlet port which opens below a surface level of the liquid stored in the second reservoir.

2. The cyclone-type separator for separating solid foreign matter, according to claim 1, wherein the liquid outlet port is connected to a discharge pipe, and the discharge pipe has a throttle which holds at a predetermined position the surface level of the liquid stored in the second reservoir.

3. The cyclone-type separator for separating solid foreign matter, according to claim 1, wherein the liquid out let port is connected to a discharge pipe, and a flow-rate control valve is provided on the discharge pipe, said flow-rate control valve adjusting a rate at which the liquid flows from the liquid outlet port, thereby to set the surface level of the liquid stored in the second reservoir at a predetermined position.

4. The cyclone-type separator for separating solid foreign matter, according to any one of claims 1 to 3, wherein the clean room is isolated from an interior of the main body by a partition wall isolates, the partition wall constitutes bottoms of the first and second reservoirs, the first and second reservoirs are partitioned by a hollow cylindrical wall extending upwards from the partition wall, and the liquid overflows the hollow cylindrical wall, flowing from the first reservoir into the second reservoir.

5. The cyclone-type separator for separating solid foreign matter, according to any one of claims 1 to 3, wherein the clean room has a top plate located above the first and second reservoirs, an air-accumulating space is provided between the top plate and the surface level of the liquid stored in the first and second reservoirs, and the separating pipe extends between the communication pipe and the top plate and has an escape hole that opens to the air-accumulating space.

* * * * *